US011867074B2

(12) United States Patent
Beier et al.

(10) Patent No.: US 11,867,074 B2
(45) Date of Patent: Jan. 9, 2024

(54) GAS TURBINE ENGINE HAVING AN ACCESSORY GEARBOX

(71) Applicant: Rolls-Royce Deutschland Ltd & Co KG, Blankenfelde-Mahlow (DE)

(72) Inventors: Jürgen Beier, Schulzendorf (DE); Kai Navtej Singh, Berlin (DE)

(73) Assignee: ROLLS-ROYCE DEUTSCHLAND LTD & CO. KG, Blankenfelde-Mahlow (DE)

( * ) Notice: Subject to any disclaimer, the term of this patent is extended or adjusted under 35 U.S.C. 154(b) by 0 days.

(21) Appl. No.: 18/007,212

(22) PCT Filed: Jul. 19, 2021

(86) PCT No.: PCT/EP2021/070152
§ 371 (c)(1),
(2) Date: Jan. 27, 2023

(87) PCT Pub. No.: WO2022/023103
PCT Pub. Date: Feb. 3, 2022

(65) Prior Publication Data
US 2023/0313704 A1    Oct. 5, 2023

(30) Foreign Application Priority Data
Jul. 29, 2020 (DE) .................. 10 2020 120 061.7

(51) Int. Cl.
*F01D 25/04* (2006.01)
*F02C 7/32* (2006.01)
*F01D 25/28* (2006.01)

(52) U.S. Cl.
CPC ............ *F01D 25/04* (2013.01); *F01D 25/28* (2013.01); *F02C 7/32* (2013.01); *F05D 2240/90* (2013.01); *F05D 2260/96* (2013.01)

(58) Field of Classification Search
CPC . F01D 25/04; F01D 25/28; F02C 7/32; F05D 2240/90; F05D 2260/96
See application file for complete search history.

(56) References Cited

U.S. PATENT DOCUMENTS 9,016,068 B2 * 4/2015 Martin ................. F02C 7/32
                                                          244/58
9,416,734 B2 * 8/2016 Thies ................. B64D 33/00
(Continued)

FOREIGN PATENT DOCUMENTS

DE          69930360          5/2006
DE    102018123061 A1        3/2020
(Continued)

OTHER PUBLICATIONS

German Search Report dated Mar. 12, 2021 from counterpart German Patent Application No. 102020120061.7.
(Continued)

*Primary Examiner* — Eldon T Brockman
(74) *Attorney, Agent, or Firm* — Timothy J. Klima; SHUTTLEWORTH & INGERSOLL PLC (57) ABSTRACT

A gas turbine engine has an accessory gearbox disposed outside of a bypass channel and connected to a housing part, which radially delimits the bypass channel, in a connection region near the housing part and in a connection region far from the housing part. A connecting element is provided between the housing part and the connection region far from the housing part. A longitudinal axis of the connecting element includes an angle in the range of 75° to 115° with a vertical axis of the accessory gearbox. The connecting element can vary a distance between the far connection region and a connection point of the connecting element on the housing part such that deformation of the housing part and a resulting position change of the connection point cause (Continued)

a lesser deflection of the accessory gearbox than a deflection with an unchanged length of the connecting element.

13 Claims, 5 Drawing Sheets

(56) References Cited

U.S. PATENT DOCUMENTS

| | | | |
|---|---|---|---|
| 9,562,477 B2* | 2/2017 | Beier | F02C 7/32 |
| 10,066,552 B2* | 9/2018 | Jiang | F02C 7/32 |
| 10,287,984 B2* | 5/2019 | Fert | F02C 3/04 |
| 10,578,204 B2* | 3/2020 | Martin | F16H 57/032 |
| 2013/0160459 A1* | 6/2013 | Thies | F02C 7/20 |
| | | | 29/888.02 |
| 2014/0013769 A1 | 1/2014 | Martin | |
| 2016/0090867 A1* | 3/2016 | Walters | F01D 25/24 |
| | | | 415/200 |
| 2017/0260908 A1 | 9/2017 | Jiang et al. | |
| 2018/0058568 A1 | 3/2018 | Martin | |
| 2022/0412270 A1* | 12/2022 | Chaput | F02C 7/36 |

FOREIGN PATENT DOCUMENTS

| | | |
|---|---|---|
| EP | 1010878 A2 | 6/2000 |
| JP | 2003286866 A | 10/2003 |

OTHER PUBLICATIONS

International Search Report and Written Opinion dated Oct. 15, 2021 from counterpart International Patent Application No. PCT/EP2021/070152.

* cited by examiner

GAS TURBINE ENGINE HAVING AN ACCESSORY GEARBOX

This application is the National Phase of International Application PCT/EP2021/070152 filed Jul. 19, 2021 which designated the U.S.

This application claims priority to German Patent Application No. 102020120061.7 filed Jul. 29, 2020, which applications are incorporated by reference herein.

The present disclosure relates to a gas turbine engine having an accessory gearbox which is arranged outside of a bypass channel.

Accessory gearboxes of known gas turbine engines are usually attached to a casing part of a gas turbine engine via three flexible attachments. These flexible attachments comprise two attachments which are provided to the right and left of a central axis and each represent a lateral attachment. The third flexible attachment is embodied as a forward front attachment of the accessory gearbox, which is at the front in relation to a direction of flow of air through the gas turbine engine and which is provided between the lateral attachments in the transverse direction of the gas turbine engine. The flexible attachments on the one hand support forces and torques on the casing part which act on the accessory gearbox and on the other hand damp transmission of vibrations between the gas turbine engine and the accessory gearbox.

In the assembled state, the flexible attachments hold such an accessory gearbox in a defined rest position, which the accessory gearbox assumes in the load-free state by virtue of the design. During operation of a gas turbine engine, the accessory gearbox is guided out of this rest position in accordance with the respectively acting operating loads of the gas turbine engine. In the design configuration of the gas turbine engine, care is taken to ensure that the deflections of the accessory gearbox from the rest position do not exceed a maximum amount over the entire operating range of the gas turbine engine in order to enable inadmissible loads on the accessory gearbox which result from the deflections of the accessory gearbox to be avoided.

The accessory gearboxes are usually coupled via the flexible attachments to an "intermediate casing" (IMC). In this case, an accessory gearbox may be attached by means of the forward front attachment at a point very close to a forward flange of the intermediate casing, via which flange the intermediate casing is operatively connected to a fan casing.

During a damage event, such as a blade breakage and an associated loss of a fan blade or a part thereof, the fan casing prevents the loose fan blade part from escaping from the gas turbine engine in the radial direction. When the free fan blade part strikes the fan casing, the fan casing is deformed by the high kinetic energy introduced into the fan casing. The impact of the fan blade part and the high kinetic energy which has to be absorbed by the fan casing cause undulating deformations of the fan casing. Since the fan casing is connected to the intermediate casing via the flange connection, the intermediate casing is also deformed in an undulating fashion.

The undulating deformations of the fan casing and of the intermediate casing cause large deflections of the accessory gearbox relative to the rest position of the accessory gearbox during unfavorable operating state processes. Such large deflections of the accessory gearbox cause unwanted bending loads of the casing of the accessory gearbox as well as considerable deflections of the accessories connected thereto. Although the vibration loads caused by deflection decay over the operating time after a damage event, high unbalance-related loads are associated with the vibrations of the accessory gearbox. Since the casing of the accessory gearbox is designed in an appropriate manner to withstand these high loads, large deflections and the resulting loads lead to high strength requirements, which are satisfied either by a greater amount of material of the casing itself or by additional stiffening elements.

It is the object of the present disclosure to provide a gas turbine engine having an accessory gearbox by means of which the disadvantages known from the prior art are overcome.

This object is achieved by a gas turbine engine having the features as disclosed herein.

According to a first aspect of the present disclosure, a gas turbine engine, in particular a gas turbine engine for an aircraft, having an accessory gearbox is provided. The accessory gearbox is connected to a casing part of the gas turbine engine, which casing part radially delimits the bypass channel. Here, there is the possibility that the casing part delimits the bypass channel radially inwardly or radially outwardly.

In a connection region near the casing part and in a connection region remote from the casing part, the accessory gearbox is connected to the casing part. A connecting element is provided between the casing part and the connection region of the accessory gearbox which is remote from the casing part.

In order to avoid impermissibly large deflections of the accessory gearbox, a longitudinal axis of the connecting element includes an angle in the range of 75° to 115°, preferably of 75° to 105°, with a vertical axis of the accessory gearbox in its position of rest. Deflections of the gearbox casing and the resulting loads on the accessory gearbox are then reduced in comparison with solutions known from the prior art. This results from the fact that connecting elements of the "forward front attachment" of the accessory gearbox to the casing part of known gas turbine engines include a substantially smaller angle with the vertical axis. As a result, undulating deflections or deformations of the casing part are transmitted to the accessory gearbox to a substantially greater extent.

In addition, to limit deflections of the accessory gearbox, provision is made for the connecting element to be designed to vary a distance between the remote connection region of the accessory gearbox and an attachment point of the connecting element on the casing part. In this case, the connecting element is configured to ensure that a deformation of the casing part and a resulting position change of the attachment point cause a deflection of the accessory gearbox which is in each case less than a deflection of the accessory gearbox in the case of an unchanged length of the connecting element.

The present disclosure is based on the knowledge that the connecting element of the forward front mounting of the accessory gearbox acts as a carrier and deformations of the casing part lead directly to a deformation of the accessory gearbox. In this case, the deformations of the accessory gearbox are caused by the displacement of the attachment point of the connecting element on the casing. In the deformed state of the accessory gearbox, the accessory gearbox or its casing is subjected to a bending load. The loads result from the fact that the attachment of the accessory gearbox in the connection regions which are near the casing part is deflected to a lesser extent than the connection region which is remote from the casing part.

The casing part is deformed in an undulating fashion in the way described more specifically above during a damage event. Therefore, the attachment point is deflected in mutually opposite directions in accordance with the progress of the vibration wave which is impressed on the casing part. This has the effect that the accessory gearbox is in each case cyclically deflected in a direction which is counter to the preceding deflection. These alternating deflections of the accessory gearbox are repeated until the deflections or deformations of the casing part are absorbed by the structural components of the gas turbine engine.

Up to this point in time, the accessory gearbox is moved back and forth or shaken at a high frequency and is pushed and pulled around the connection regions near the casing part by the connecting element. This causes high loads with high-frequency cycles, thereby impairing a service life of the accessory gearbox.

By means of the proposed attachment of the connecting element to the accessory gearbox in an angular range of 75° to 115°, preferably of 75° to 105°, and the possibility of varying the distance between the remote connection region of the accessory gearbox and the attachment point of the connecting element on the casing part, loads on the accessory gearbox can be reduced in a simple manner, even in the case of severe deformations of the casing part, to such an extent that inadmissible loads on the accessory gearbox are avoided with little design complexity.

In an advantageous embodiment of the gas turbine engine according to the present disclosure, the angle between the longitudinal axis of the connecting element and the vertical axis of the accessory gearbox has values in the range of 85° to 95°.

Deflections of the accessory gearbox are minimal if the angle between the longitudinal axis of the connecting element and the vertical axis of the accessory gearbox is substantially 90°.

A further connecting element can be provided between the casing part and the connecting element. In this case, there is the possibility that a first end of the further connecting element is near the casing part and is connected to the casing part. In addition, there is the possibility that the second end of the further connecting element is remote from the casing part. In addition, the attachment point of the connecting element on the casing part can be provided in the region of the second end of the further connecting element. It is then possible to attach the connecting element to the accessory gearbox in the abovementioned angular ranges in a manner that is simple in terms of design.

In this case, the further connecting element can be embodied as a rigid rod-like or beam-like component.

In addition, the further connecting element can be operatively connected in a fixed manner by its first end to the casing part and in an articulated manner by its second end to the connecting element. It is then possible, on the one hand, to achieve the desired firm attachment of the accessory gearbox to the casing part. On the other hand, the operative connection between the accessory gearbox and the casing part is embodied with such flexibility on account of the articulated attachment of the connecting element to the accessory gearbox that loads on the accessory gearbox do not reach inadmissibly high values in the event of large deformations of the casing part.

In addition, there is also the possibility of the connecting element being connected in an articulated manner to the accessory gearbox in order to avoid unwanted high loads on the accessory gearbox.

The connecting element can be embodied with a component elasticity between the attachment point on the further connecting element and the connection region to the accessory gearbox. In this case, the component elasticity can be embodied in such a way that the change in the length of the connecting element between the attachment point on the casing part and the accessory gearbox occurs as a function of a deformation of the casing part and a resulting displacement of the attachment point.

In this case, the length of the connecting element is shortened when the casing part is deformed in such a way that the distance between the attachment point of the connecting element on the casing and the rest position of the remote connection region of the accessory gearbox is reduced. This means that the connecting element is then compressed in the longitudinal direction in accordance with the deformation of the casing part.

In addition, the length of the connecting element increases when the distance between the attachment point of the connecting element on the casing part and the rest position of the remote connection region of the accessory gearbox increases.

In this case, the rest position of the remote connection region is understood to mean the position which the remote connection region has in the rest position of the accessory gearbox.

For this purpose, the connecting element can have, for example, a bone-shaped configuration between the attachment point on the casing part and the remote connection region of the accessory gearbox. In the present case, a bone-shaped configuration of the connecting element is understood to mean a shape of the connecting element which has a cross-sectional constriction between these two attachment points of the connecting element on the casing part and on the accessory gearbox, said constriction allowing the desired component elasticity.

In addition or as an alternative to this, provision can also be made for the connecting element to be of multi-part design in the longitudinal direction. Thus, there is the possibility that the connecting element is embodied with an elastic disk, such as a rubber disk or the like, between two rigid regions in order to allow the desired elongation and compression of the connecting element in the longitudinal direction.

In a further advantageous embodiment of the gas turbine engine according to the present disclosure, the connecting element comprises at least two interconnected partial elements. The partial elements can be arranged at an angle to one another. The one partial element can be connected at one end, at the attachment point, to the casing part and at the other end to a first end of the other partial element. The other partial element can be operatively connected by its second end to the accessory gearbox or to the remote connection region of the accessory gearbox. Owing to the angular arrangement of the two partial elements with respect to one another, there is in turn the possibility that, in the event of a correspondingly large deflection or deformation of the casing part, a distance between the attachment point of the connecting element on the casing part and the remote connection region of the accessory gearbox is increased or reduced by correspondingly elastic changes in the angle between the two partial elements. As a result, a deflection of the accessory gearbox which results from the deformation of the casing part is less than in the case of known gas turbine engines.

If, starting from the first end, a cross section of the further connecting element decreases continuously in the direction of the second end, the further connecting element too is embodied with a component elasticity which limits loads in the region of the accessory gearbox in a damage event.

Loads in the region of the accessory gearbox are limited in a manner which is simple in terms of design if the connecting element is operatively connected in an articulated manner via spherical bearings to the accessory gearbox and to the casing part.

The casing part can be a region of an intermediate casing which delimits the bypass channel radially inwardly, i.e. with respect to an engine core, or radially outwardly, i.e. with respect to an environment of the gas turbine engine. In this case, there is the possibility that the accessory gearbox is operatively connected to the casing part in each case on the side of the casing part which faces away from the bypass channel.

This also means that the accessory gearbox is provided either radially outside or radially inside the bypass channel, for example between the bypass channel and an engine core. In addition, there is also the possibility that an accessory gearbox arranged on a casing part of a gas turbine engine in the scope described in more detail above is provided both radially outside the bypass channel, for example in an engine nacelle, and radially inside the bypass channel, for example between the bypass channel and the engine core.

It is self-evident to a person skilled in the art that a feature or parameter described in relation to one of the above aspects can be applied to any other aspect, unless they are mutually exclusive. Furthermore, any feature or any parameter described here may be applied to any aspect and/or combined with any other feature or parameter described, unless they are mutually exclusive. Further advantages and advantageous developments of the invention can be found in the claims and the exemplary embodiments described based on the concept with reference to the drawings.

Embodiments will now be described, by way of example, with reference to the figures.

In the figures.

Figure 1:
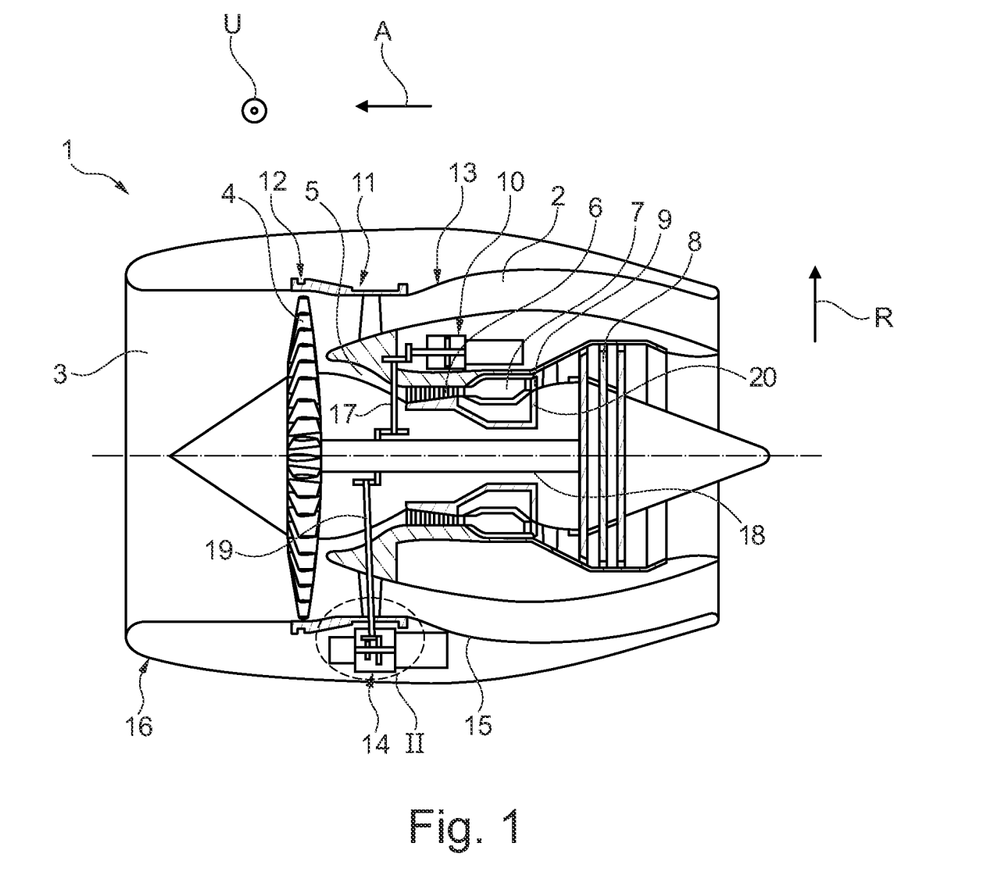
FIG. 1 shows a simplified longitudinal sectional view of a gas turbine engine having two accessory gearboxes.

FIG. 1 shows a gas turbine engine 1 of an aircraft in a simplified longitudinal sectional view. The gas turbine engine 1 comprises a subsidiary flow channel or bypass channel 2 and an inlet region 3. Downstream of the inlet region 3, a fan 4 is connected in a manner which is known per se.

After the fan 4, the fluid flow in the gas turbine engine 1 is divided into a bypass flow and a core flow. The bypass flow flows through the bypass channel 2, whereas the core flow flows into an engine core 5. The engine core 5 is embodied with a compressor device 6, with a burner 7, with a low-pressure turbine 8 which is provided to drive the fan 4, and with a high-pressure turbine 9 provided to drive the compressor device 6.

In addition, FIG. 1 shows a schematically illustrated accessory gearbox 10 which is arranged substantially in the region of an intermediate casing 11 of the gas turbine engine 1. In the manner illustrated in more detail in FIG. 2, the intermediate casing 11 is located between a fan casing 12 and a bypass channel casing 13, which adjoins the intermediate casing 11, in the axial direction A of the gas turbine engine 1. The accessory gearbox 10 is arranged in the intermediate casing 11 between the bypass channel 2 and the engine core 5, i.e. radially inside the bypass channel 2.

Furthermore, a further accessory gearbox 14 is provided radially outside the bypass channel 2 and is positioned on the side of the intermediate casing 11 which faces away from the engine core 5. The further accessory gearbox 14 is arranged between a radially outer boundary 15 of the bypass channel 2 and within an engine nacelle 16.

The accessory gearbox 10 is driven by a radial shaft 17, which is operatively connected to a core shaft 18 extending in the axial direction A of the gas turbine engine 1. The further accessory gearbox 14 is driven by a further radial shaft 19, which is likewise operatively connected to the core shaft 18.

In the present case, the core shaft 18 is a low-pressure shaft of the gas turbine engine 1 which, in the operation of the gas turbine engine 1, rotates at a lower speed than another core shaft 20, which is arranged coaxially therewith and is what is known as a high-pressure shaft.

Depending on the respective application, there is the possibility that the gas turbine engine 1 is designed only with the accessory gearbox 10 or only with the further accessory gearbox 14.

Figure 2:
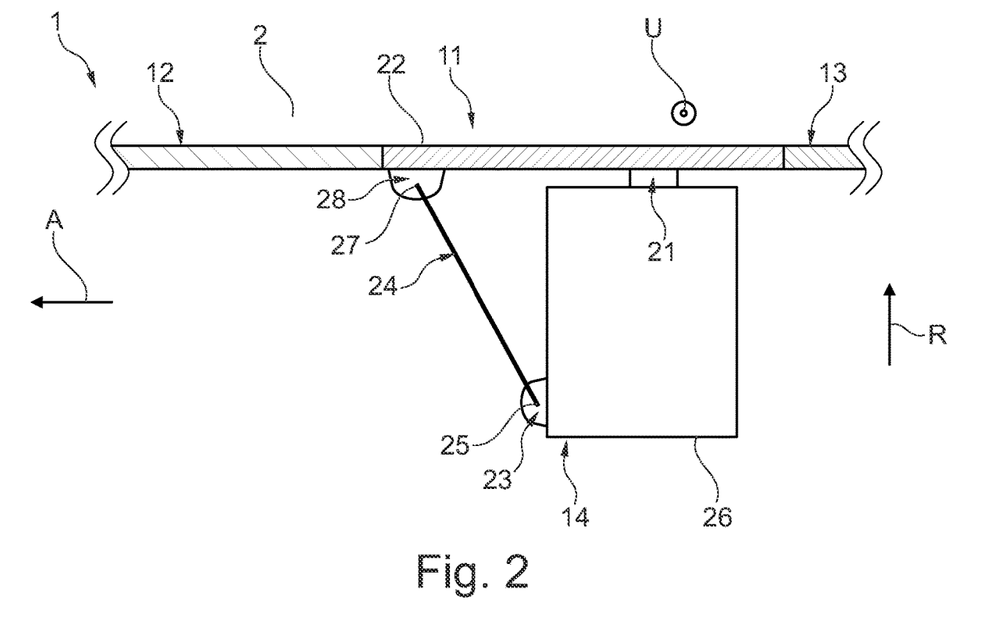
FIG. 2 shows a schematic illustration of a region II which is identified more specifically in FIG. 1 and which comprises one of the accessory gearboxes.

FIG. 2 shows the region II, which is identified more specifically in FIG. 1, in which the further accessory gearbox 14 is arranged. The further accessory gearbox 14 is connected in a connection region 21 to a casing part 22 of the intermediate casing 11. In this case, the connection region 21 faces the casing part 22. In addition, the further accessory gearbox 14 is operatively connected to the casing part 22 in a further connection region 23 via a connecting element 24, wherein the casing part 22 forms part of the outer boundary 15 of the bypass channel 2.

In the region of a first end 25, the connecting element 24 is connected in the further connection region 23 to a casing 26 of the further accessory gearbox 14. In addition, the connecting element 24 is connected in the region of a second end 27 to an attachment point 28 of the casing part 22.

Figure 3:
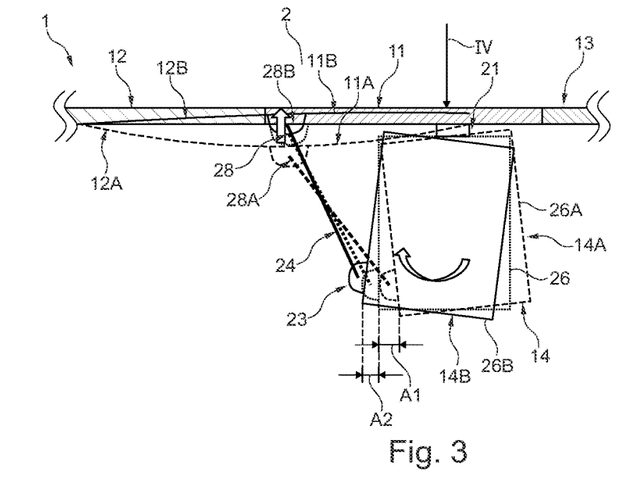
FIG. 3 shows an illustration of region II corresponding to FIG. 2, wherein the accessory gearbox is shown in different positions.

FIG. 3 shows an illustration corresponding to FIG. 2 of region II of the gas turbine engine 1. FIG. 3 shows the fan casing 12, the intermediate casing 11, the further accessory gearbox 14 and the connecting element 24 in the positions of rest which are shown in FIG. 2 and which these components have in the load-free state.

In addition, the fan casing 12, the intermediate casing 11, the further accessory gearbox 14 and the connecting element 24 are shown in positions that deviate from the rest positions in each case. The fan casing 12 has the profile identified more specifically by reference sign 12A when, for example, a blade break occurs in the region of the fan 4 and one of the fan blades flies outward at high speed in the radial direction R within the fan casing 12 and strikes the inner side of the fan casing 12.

As a result of the impact of the free fan blade part, the fan casing 12 is first of all deformed radially outward. Since the intermediate casing 11 is connected to the fan casing 12 via a flange (not shown specifically), the deformation of the fan casing 12 is transmitted to the intermediate casing 11. This has the effect that the attachment point 28 is deflected radially outward from its rest position into the position indicated more specifically by reference sign 28A. In the presence of a rigid connection between the attachment point 28 and the connection region 23, the casing 26 of the further accessory gearbox 14 is pivoted about the connection region 21 from the position of rest of the accessory gearbox 14 into the position shown indicated by reference sign 14A. The deflection of the further accessory gearbox 14 from its position of rest or rest position is identified more specifically in FIG. 3 by reference sign A1.

The fan casing 12 is deformed in an undulating fashion by the impact of the free blade part, with the result that the fan casing 12 undergoes an oscillating deformation. This means that the fan casing 12 not only oscillates radially outward but also, after the initial radially outward deformation, radially inward again. This deformation of the fan casing 12 is shown by the profile of the fan casing 12 indicated more specifically by reference sign 12B.

The radially inwardly directed deformation of the fan casing 12 has the effect that, starting from the position indicated by reference sign 28A, the attachment point 28 is deflected radially inward and beyond the rest position 28 into the position indicated by reference sign 28B. The further accessory gearbox 14 is thereby transferred by the connecting element 24 into the pivoted position indicated more specifically by reference sign 14B. In this case, the deflection which the accessory gearbox 14 undergoes in relation to the rest position indicated by reference sign 14 is identified in FIG. 3 by reference sign A2.

Figure 4:
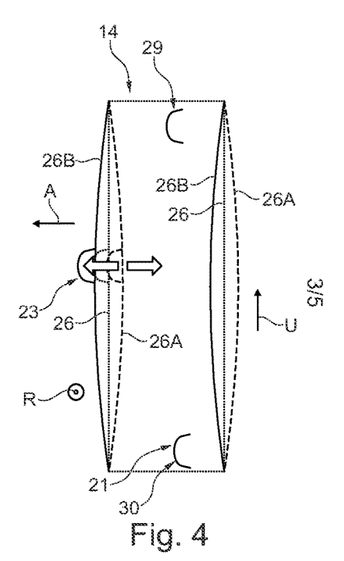
FIG. 4 shows the accessory gearbox from a view IV identified more specifically in FIG. 3.

FIG. 4 shows the accessory gearbox 14 from a view IV identified more specifically in FIG. 3. It is apparent from the illustration according to FIG. 4 that the connection region 21 comprises two lateral attachment points 29 and 30, which are spaced apart from one another in the circumferential direction U of the gas turbine engine 1. In the region of the attachment points 28, 29 and 30, spherical bearings are provided in each case, comprising bolts or the like mounted in rubber bearings.

Furthermore, it is apparent from the illustration according to FIG. 4 that the casing 26 of the further accessory gearbox 14 is bent or deformed in the axial direction A between the attachment points 29 and 30 owing to the deformation of the fan casing 12 and the attachment to the casing part 22 in the region of the two further attachment points 29 and 30. The deformations of the casing 26 are each identified more specifically by reference signs 26A and 26B.

Figure 5:
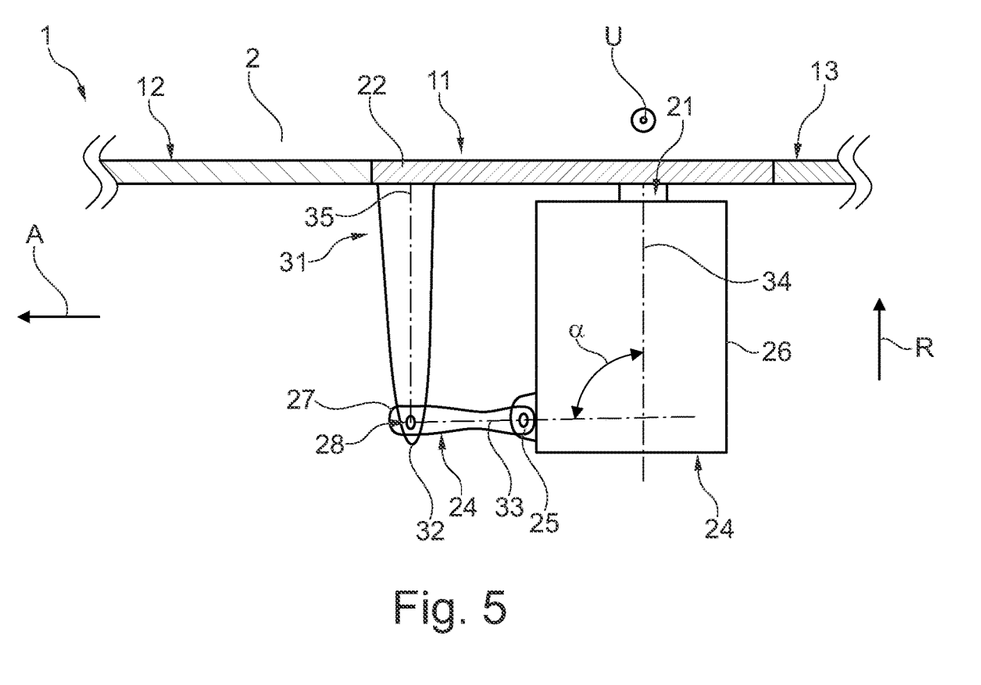
FIG. 5 shows an illustration, corresponding to FIG. 3, of a further embodiment of the gas turbine engine.

In order to minimize or limit the deflections A1 and A2 of the further accessory gearbox 14 which are indicated in FIG. 3, the further accessory gearbox 14 is attached to the casing part 22 of the intermediate casing 11 to the extent illustrated in FIG. 5. In the exemplary embodiment of the gas turbine engine 1 shown in FIG. 5, the connecting element 24 is operatively connected to the casing part 22 via a further connecting element 31. The further connecting element 31 is rigidly connected to the casing part 22 and projects outward from the casing part 22 in the radial direction R.

In the present case, the attachment point 28 for the connecting element 24 on the casing part 22 is provided in the region of the free end 32 of the further connecting element 31. In the present case, a radial distance between the attachment point 28 and the casing part 22 is designed in such a way that a longitudinal axis 33 of the connecting element 24 includes an angle α of approximately 90° with a vertical axis 34 of the further accessory gearbox 14 and with a longitudinal axis 35 of the further connecting element 31 in the position of rest of the casing part 22 and of the further accessory gearbox 14. In this case, the vertical axis 34 of the further accessory gearbox 14 and the longitudinal axis 35 of the further connecting element 31 run substantially in the radial direction R in the position of rest of the gas turbine engine 1 shown in FIG. 5.

In addition, the connecting element 24 is connected both to the connection region 23 of the casing 26 of the further accessory gearbox 14 and to the attachment point 28 of the further connecting element 31 or of the casing part 22 in each case in an articulated manner.

Figures 6, 7, 8, 9:
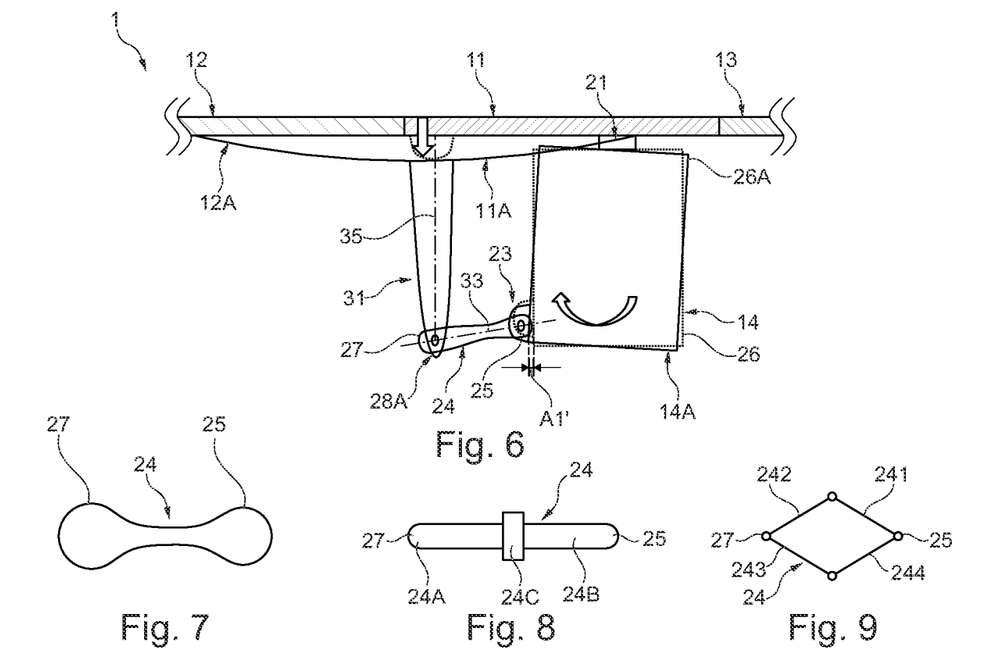
FIG. 6 shows an illustration, corresponding to FIG. 5, of a further exemplary embodiment of the gas turbine engine with a deflected accessory gearbox.
FIG. 7 shows a further embodiment of a connecting element of the gas turbine engine, which is arranged between the accessory gearbox and a casing part of the gas turbine engine.
FIG. 8 shows a further embodiment of the connecting element, which is formed with an elastic element.
FIG. 9 shows a further embodiment of the connecting element, which comprises partial elements arranged at an angle to one another.

FIG. 6 shows an illustration, corresponding to FIG. 5, of the region II, wherein the fan casing 12 and the further accessory gearbox 14 are shown both in their rest position and in their deflected or deformed operating states 12B and 14B, respectively. It is apparent from the illustration according to FIG. 6 that the "toggle lever attachment" of the further accessory gearbox 14 to the intermediate casing 11 brings about significantly less deflection A1' of the accessory gearbox 14 relative to its rest position, as compared with the illustration according to FIG. 3, for the same radial deflection of the fan casing 12 and of the intermediate casing 11.

As an alternative to this or in addition to this, there is also the possibility of embodying the connecting element 24 with a defined component elasticity so that a length of the connecting element 24 is variable. For this purpose, the connecting element 24 can be embodied in the manner illustrated by way of example in FIG. 7 to FIG. 9.

In the embodiment shown in FIG. 7, the connecting element 24 has what is known as a bone shape. The end 25 adjacent to the connection region 23 and the second end 27 of the connecting element 24, which is adjacent to the attachment point 28, each have a larger cross section than the region between them. This cross-sectional configuration of the connecting element 24 offers the possibility that a corresponding tensile or compressive load on the connecting element 24 brings about a change in the length of the connecting element 24, i.e. an elongation or a compression. For a compressive load, the connecting element 24 is designed in such a way that elastic buckling can occur, as a result of which an axial length of the connecting element 24 is shortened and thus also the distance between the connection region 23 and the attachment point 28. For a tensile load, the connecting element 24 is designed in such a way that the connecting element 24 allows an elastic elongation. The variable length of the connecting element 24 offers the possibility of limiting the deflections A1 and A2 of the further accessory gearbox 14 if the fan casing 12 and the intermediate casing 11 operatively connected thereto are deformed radially outward or inward to the extent described above.

The embodiment of the connecting element 24 shown in FIG. 8 has two rigid parts 24A and 24B, which are operatively connected to one another via an elastically deformable intermediate element 24C. The function of the elastic intermediate element 24C is to allow elongation or compression of the connecting element 24 in the case of a corresponding compressive or tensile load on the connecting element 24.

As a result, the deflections A1 and A2 of the accessory gearbox 14 can be compensated to a certain extent and limited to a minimum in the event of a radial deformation of the fan casing 12.

In the exemplary embodiment of the connecting element 24 shown in FIG. 9, the connecting element 24 has four partial elements 241 to 244. In this case, the partial elements 241 and 242 and the partial elements 243 and 244 are in each case arranged at an angle to one another and connected to one another. The substantially rhombic arrangement of the partial elements 241 to 244 offers the possibility, in a kinematic way, of increasing or shortening a distance between the connection region 23 and the attachment point 28 to the desired extent when there is a compressive or tensile load on the connecting element 24.

In addition, however, the pendulum function of the connecting element 24 can also be used in order to allow shortening or lengthening of the distance. For this purpose, as can be seen in FIGS. 2, 3, 5 and 6 and already described above, the connecting element 24 is mounted in an articulated manner at the respective attachment points, thus enabling rotation about the respective attachment points. In the event of a radial displacement of the fan casing 12 or of the intermediate casing 11, the accessory gearbox can oscillate, with the result that the displacements of the fan casing 12 and/or of the intermediate casing 11 are not completely transmitted to the accessory gearbox 14, resulting in a smaller displacement of the accessory gearbox 14.

During the oscillation of the accessory gearbox 14, the length of the connecting element 24 can change. Such a change in length usually occurs in the case of large angular changes. This change in length is compensated by the elastic or kinematic design of the connecting element in accordance with the embodiments of FIG. 7 or 8 or 9, with the result that a distance between the remote connection region 23 of the accessory gearbox 14 and an attachment point 28 of the connecting element 24 on the casing part 22 varies in such a way that a deformation of the casing part 22 and a resulting change in position of the attachment point 28 causes a deflection of the accessory gearbox 14 which is in each case less than a deflection of the accessory gearbox 14 in the case of an unchanged, i.e. rigid, length of the connecting element.

The accessory gearbox 10 is attached to the intermediate casing 11 substantially in the same way as the further accessory gearbox 14, for which reason an explicit description is dispensed with and reference is made to the above description in respect of the structural design and mode of operation regarding the attachment of the further accessory gearbox 14 to the intermediate casing 11.

At this point, it is also pointed out that the deflections of the accessory gearboxes 10 and 14 can also be limited in dependence on the design of the distances between the attachment points 29, 30 of connection region 21 and connection region 23. The exemplary embodiments described in more detail above can each be integrated into existing engine systems with little design effort in order to limit loads in the region of accessory gearboxes.

LIST OF REFERENCE SIGNS

1 Gas turbine engine
2 Bypass channel
3 Inlet region
4 Fan
5 Engine core
6 Compressor device
7 Burner
8 Low-pressure turbine
9 High-pressure turbine
10 Accessory gearbox
11, 11A, 11B Intermediate casing
12, 12A, 12B Fan casing
13 Bypass channel casing
14, 14A, 14B Further accessory gearbox
15 Outer boundary of the bypass channel
16 Engine nacelle
17 Radial shaft
18 Core shaft
19 Further radial shaft
20 Further core shaft
21 Connection region
22, 22A, 22B Casing part
23 Further connection region
24 Connecting element
24A, 24B Partial element
24C Intermediate element
25 End of connecting element 24
26 Casing of the further accessory gearbox
27 Second end of connecting element 24
28, 28A, 28B Attachment point of connecting element 24 on casing part 22
29, 30 Attachment points
31 Further connecting element
32 Second end of further connecting element 31
33 Longitudinal axis of connecting element 24
34 Vertical axis of the further accessory gearbox
35 Longitudinal axis of further connecting element 31
241 to 244 Partial element of connecting element 24
A Axial direction
R Radial direction
U Circumferential direction
A1, A2, A1' Deflection of the further accessory gearbox
α Angle

The invention claimed is:

1. A gas turbine engine, comprising: having
a casing part radially delimiting a bypass channel,
an accessory gearbox arranged outside of the bypass channel,
wherein the accessory gearbox is connected to the casing part, in an adjacent connection region near the casing part and in a remote connection region remote from the casing part,
a connecting element connecting between the casing part and the remote connection region of the accessory gearbox,
wherein a longitudinal axis of the connecting element includes an angle in a range of 75° to 115° with a vertical axis of the accessory gearbox, and
the connecting element being configured to vary a distance between the remote connection region of the accessory gearbox and an attachment point of the connecting element to the casing part such that a deformation of the casing part and a resulting position change of the attachment point cause a deflection of the accessory gearbox which is less than a deflection of the accessory gearbox when there is an unchanged length of the connecting element.

2. The gas turbine engine as claimed in claim 1, wherein the angle is in a range of 85° to 95°.

3. The gas turbine engine as claimed in claim 1, wherein the angle is substantially equal to 90°.

4. The gas turbine engine as claimed in claim 1, wherein a further connecting element, having a first end and a second end, connects between the casing part and the connecting element, the first end being near the casing part and beings connected to the casing part and the second end being remote from the casing part, wherein the attachment point of the connecting element on the casing part is provided in a region of the second end of the further connecting element.

5. The gas turbine engine as claimed in claim 4, wherein the further connecting element is operatively connected in a fixed manner by the first end to the casing part and in an articulated manner by the second end to the connecting element.

6. The gas turbine engine as claimed in claim 1, wherein the connecting element is connected in an articulated manner to the accessory gearbox.

7. The gas turbine engine as claimed in claim 4, wherein the connecting element has a component elasticity between an attachment point on the further connecting element and the remote connection region with the accessory gearbox, with the result that the change in the length of the connecting element between the attachment point and the accessory gearbox occurs as a function of a deformation of the casing part and a resulting displacement of the attachment point.

8. The gas turbine engine as claimed in claim 1, wherein, at least in some region or regions, the connecting element has a component elasticity such that the length of the connecting element between the attachment point and the accessory gearbox changes in the event of a deformation of the casing part and a resulting displacement of the attachment point.

9. The gas turbine engine as claimed in claim 1, wherein the connecting element comprises at least two interconnected partial elements, which are arranged at an angle to one another, wherein a first one of the partial elements is connected at one end, at the attachment point, to the casing part and at another end, by a first end, to a second one of the partial elements, and wherein the second one of the partial elements is operatively connected by ails second end thereof to the accessory gearbox.

10. The gas turbine engine as claimed in claim 4, wherein, starting from the first end, a cross section of the further connecting element decreases continuously in a direction of the second end.

11. The gas turbine engine as claimed in claim 1, and further comprising spherical bearings, wherein the connecting element is operatively connected in an articulated manner via the spherical bearings to the accessory gearbox and to the casing part.

12. The gas turbine engine as claimed in claim 1, wherein the casing part is a region of an intermediate casing which delimits the bypass channel radially inwardly or radially outwardly, wherein the accessory gearbox is operatively connected to the casing part on a side of the casing part which faces away from the bypass channel.

13. The gas turbine engine as claimed in claim 1, wherein the angle is in a range of 75° to 105°.

* * * * *